US012663926B2

(12) United States Patent
Zhu et al.

(10) Patent No.: US 12,663,926 B2
(45) Date of Patent: Jun. 23, 2026

(54) DATA PROCESSING METHOD AND DEVICE

(71) Applicant: Cloud Intelligence Assets Holding (Singapore) Private Limited, Singapore (SG)

(72) Inventors: Yunfeng Zhu, Hangzhou (CN); Xiangguang Yan, Hangzhou (CN); Shuai Zhao, Hangzhou (CN)

(73) Assignee: Cloud Intelligence Assets Holding (Singapore) Private Limited, Singapore (SG)

( * ) Notice: Subject to any disclaimer, the term of this patent is extended or adjusted under 35 U.S.C. 154(b) by 0 days.

(21) Appl. No.: 18/850,917

(22) PCT Filed: Mar. 29, 2023

(86) PCT No.: PCT/CN2023/084738
§ 371 (c)(1),
(2) Date: Sep. 25, 2024

(87) PCT Pub. No.: WO2023/185934
PCT Pub. Date: Oct. 5, 2023

(65) Prior Publication Data

US 2025/0224883 A1 Jul. 10, 2025

(30) Foreign Application Priority Data

Mar. 31, 2022 (CN) .......................... 202210333042.1

(51) Int. Cl.
*G06F 12/00* (2006.01)
*G06F 3/06* (2006.01)
(52) U.S. Cl.
CPC .......... *G06F 3/0619* (2013.01); *G06F 3/0623* (2013.01); *G06F 3/0659* (2013.01); *G06F 3/067* (2013.01)

(58) Field of Classification Search
None
See application file for complete search history.

(56) References Cited

U.S. PATENT DOCUMENTS

2020/0225875 A1* 7/2020 Oh ......................... G06F 3/0614
2021/0034258 A1* 2/2021 O'Brien, III .......... G06F 3/0626

FOREIGN PATENT DOCUMENTS

CN 103036717 A 4/2013
CN 110399383 A 11/2019
CN 114415984 A 4/2022

OTHER PUBLICATIONS

International Search Report, PCT/CN2023/084738, Jun. 18, 2023 (5 pgs.).

* cited by examiner

*Primary Examiner* — Daniel D Tsui
(74) *Attorney, Agent, or Firm* — Osha Bergman Watanabe & Burton LLP

(57) ABSTRACT

A data processing method and apparatus are disclosed. The data processing method comprises: receiving a data processing request, wherein the data processing request carries target data; generating, based on the target data, a data preprocessing request for the target data; sending the data preprocessing request to at least two data storage modules respectively; in a case where a preprocessing completion notification returned by each data storage module in response to the data preprocessing request is received, sending the data processing request to each data storage module; and receiving a data processing completion notification returned by each data storage module in response to the data processing request. The method ensures the data consistency of each data storage module, further avoiding the problem of data loss in a case where any data storage module of at least two data storage modules fails, thereby ensuring the security of data.

18 Claims, 7 Drawing Sheets

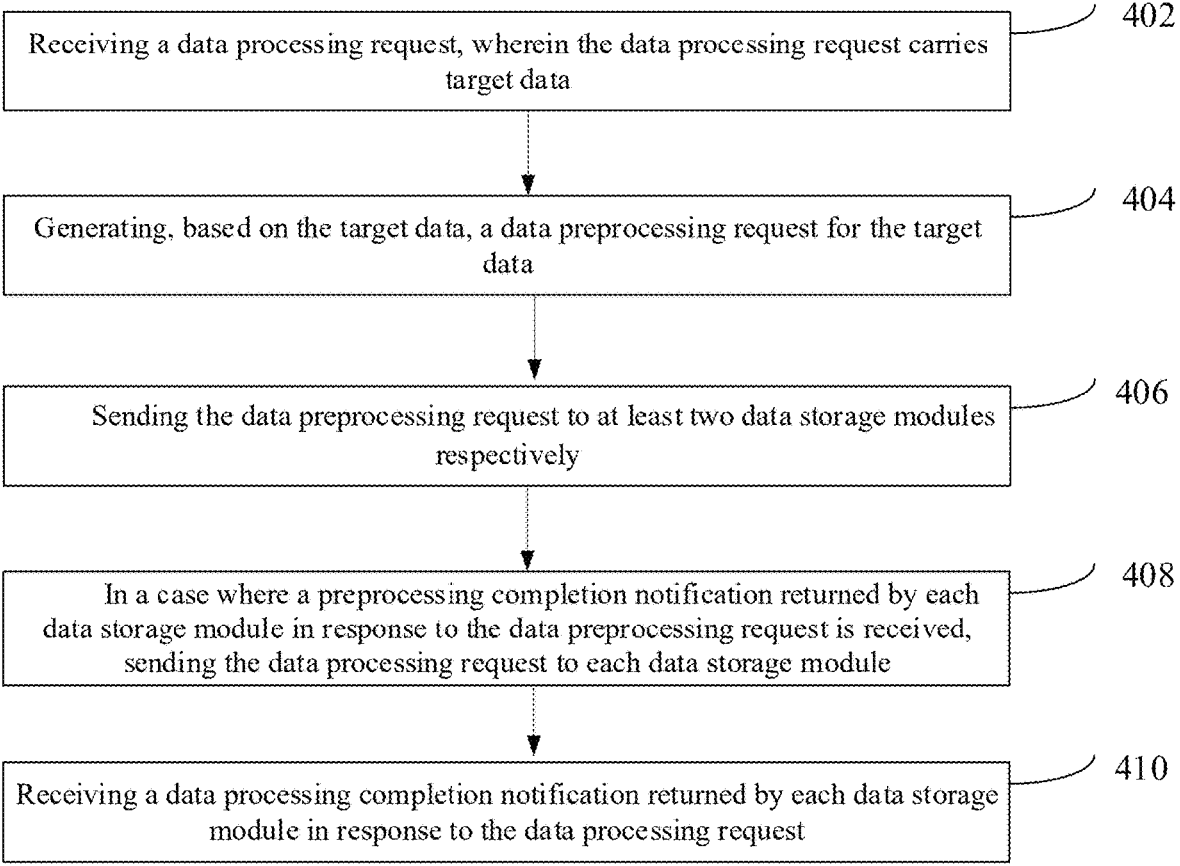

Receiving a data processing request, wherein the data processing request carries target data — 402

Generating, based on the target data, a data preprocessing request for the target data — 404

Sending the data preprocessing request to at least two data storage modules respectively — 406

In a case where a preprocessing completion notification returned by each data storage module in response to the data preprocessing request is received, sending the data processing request to each data storage module — 408

Receiving a data processing completion notification returned by each data storage module in response to the data processing request — 410

FIG. 4

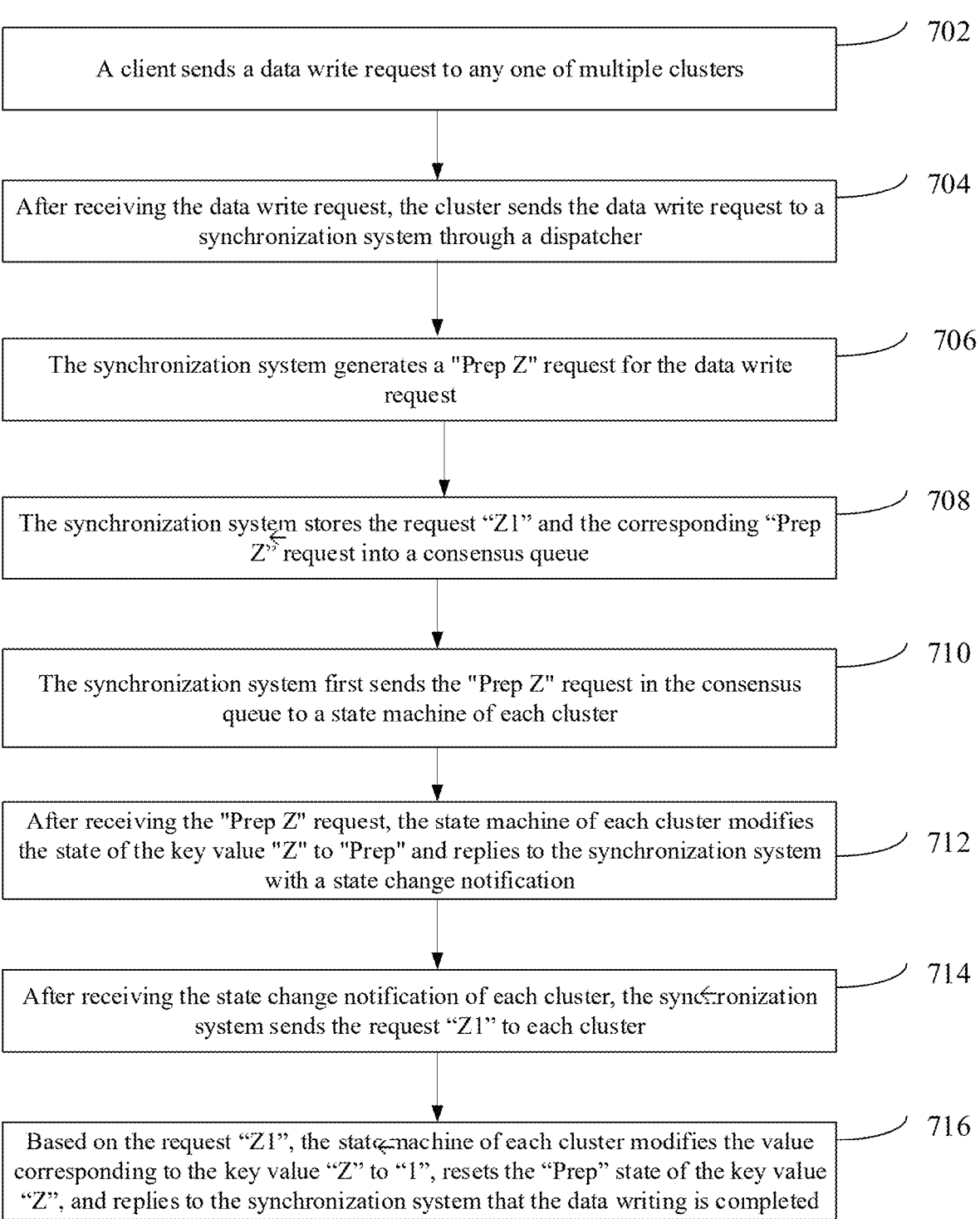

A client sends a data write request to any one of multiple clusters — 702

After receiving the data write request, the cluster sends the data write request to a synchronization system through a dispatcher — 704

The synchronization system generates a "Prep Z" request for the data write request — 706

The synchronization system stores the request "Z1" and the corresponding "Prep Z" request into a consensus queue — 708

The synchronization system first sends the "Prep Z" request in the consensus queue to a state machine of each cluster — 710

After receiving the "Prep Z" request, the state machine of each cluster modifies the state of the key value "Z" to "Prep" and replies to the synchronization system with a state change notification — 712

After receiving the state change notification of each cluster, the synchronization system sends the request "Z1" to each cluster — 714

Based on the request "Z1", the state machine of each cluster modifies the value corresponding to the key value "Z" to "1", resets the "Prep" state of the key value "Z", and replies to the synchronization system that the data writing is completed — 716

DATA PROCESSING METHOD AND DEVICE

CROSS-REFERENCE TO RELATED APPLICATIONS

The present application claims priority of Chinese patent application No. 202210333042.1 filed with the China Patent Office on Mar. 31, 2022, entitled "Data Processing Method and Device", which is incorporated in the present application by reference in its entirety.

TECHNICAL FIELD

Embodiments of the present specification relate to the technical field of computers, and in particular, to a data processing method.

BACKGROUND

With the advent of big data era, data has emerged as a pivotal asset for many enterprises. Thus, the necessity for data disaster recovery has become ubiquitous among numerous enterprises. In particular, for financial, Internet and other enterprises with high data disaster recovery needs, in order to further avoid data loss, data will be stored in multiple data storage nodes of a distributed system. However, in a case where any of the data storage nodes in the distributed system fails, the entire distributed system will experience problems such as data loss and data inconsistency, which seriously affects data security.

SUMMARY

In view of this, embodiments of the present specification provide a data processing method. One or more embodiments of the present specification simultaneously relate to a data processing apparatus, a data processing system, a computing device, a computer-readable storage medium, and a computer program, to solve technical defects existing in the prior art.

According to a first aspect of the embodiments of the present specification, a data processing method is provided, including:

receiving a data processing request, wherein the data processing request carries target data;

generating, based on the target data, a data preprocessing request for the target data;

sending the data preprocessing request to at least two data storage modules respectively;

in a case where a preprocessing completion notification returned by each data storage module in response to the data preprocessing request is received, sending the data processing request to each data storage module; and receiving a data processing completion notification returned by each data storage module in response to the data processing request.

According to a second aspect of the embodiments of the present specification, a data processing apparatus is provided, including:

a first receiving module configured to receive a data processing request, wherein the data processing request carries target data;

a generating module configured to generate, based on the target data, a data preprocessing request for the target data;

a first sending module configured to send the data preprocessing request to at least two data storage modules respectively;

a second sending module configured to send the data processing request to each data storage module in a case where a preprocessing completion notification returned by each data storage module in response to the data preprocessing request is received; and a second receiving module configured to receive a data processing completion notification returned by each data storage module in response to the data processing request.

According to a third aspect of the embodiments of the present specification, a data processing system is provided, including a request processing module and at least two data storage modules, wherein the request processing module is configured to receive a data update request carrying target data for updating initial data in data storage units included in the data storage modules, generate, based on the target data, a data preprocessing request for the target data, and send the data preprocessing request to the at least two data storage modules respectively;

the at least two data storage modules are configured to set data storage units corresponding to the target data to be inaccessible based on the data preprocessing request, and send a preprocessing completion notification to the request processing module;

the request processing module is further configured to send the data update request to the at least two data storage modules in a case where the preprocessing completion notification returned by each data storage module in response to the data preprocessing request is received;

the at least two data storage modules are configured to update, according to the data update request, the initial data in the data storage units with the target data, and send a data processing completion notification to the request processing module.

According to a fourth aspect of the embodiments of the present specification, a computing device is provided, including:

a memory and a processor;

the memory is used for storing computer-executable instructions, and the processor is used for executing the computer-executable instructions, which, when executed by the processor, implement the steps of the data processing method.

According to a fifth aspect of the embodiments of the present specification, a computer-readable storage medium is provided, having computer-executable instructions stored thereon which, when executed by a processor, implement the steps of the data processing method.

According to a sixth aspect of the embodiments of the present specification, a computer program is provided, which, when executed in a computer, causes the computer to perform the steps of the data processing method.

In the data processing method provided in the present specification, a data processing request is received, wherein the data processing request carries target data; based on the target data, a data preprocessing request for the target data is generated; the data preprocessing request is sent to at least two data storage modules respectively; in a case where a preprocessing completion notification returned by each data storage module in response to the data preprocessing request is received, the data processing request is sent to each data storage module; and a data processing completion notification returned by each data storage module in response to the data processing request is received.

Specifically, in a case where a data processing request is received, a data preprocessing request is first generated based on target data carried in the data processing request and sent to at least two data storage modules; and in a case where a preprocessing completion notification sent back by each data storage module is received, the data processing request is then sent to each data storage module, so that each data storage module can acquire the target data, thereby ensuring the data consistency of each data storage module, further avoiding the problem of data loss caused by failure of any of the at least two data storage modules, and ensuring the security of data.

BRIEF DESCRIPTION OF THE DRAWINGS

FIG. 4 is a flow chart of a data processing method provided according to an embodiment of the present specification;

FIG. 7 is a flow chart of the process of a data processing method provided according to an embodiment of the present specification;

DETAILED DESCRIPTION

Figure 1:
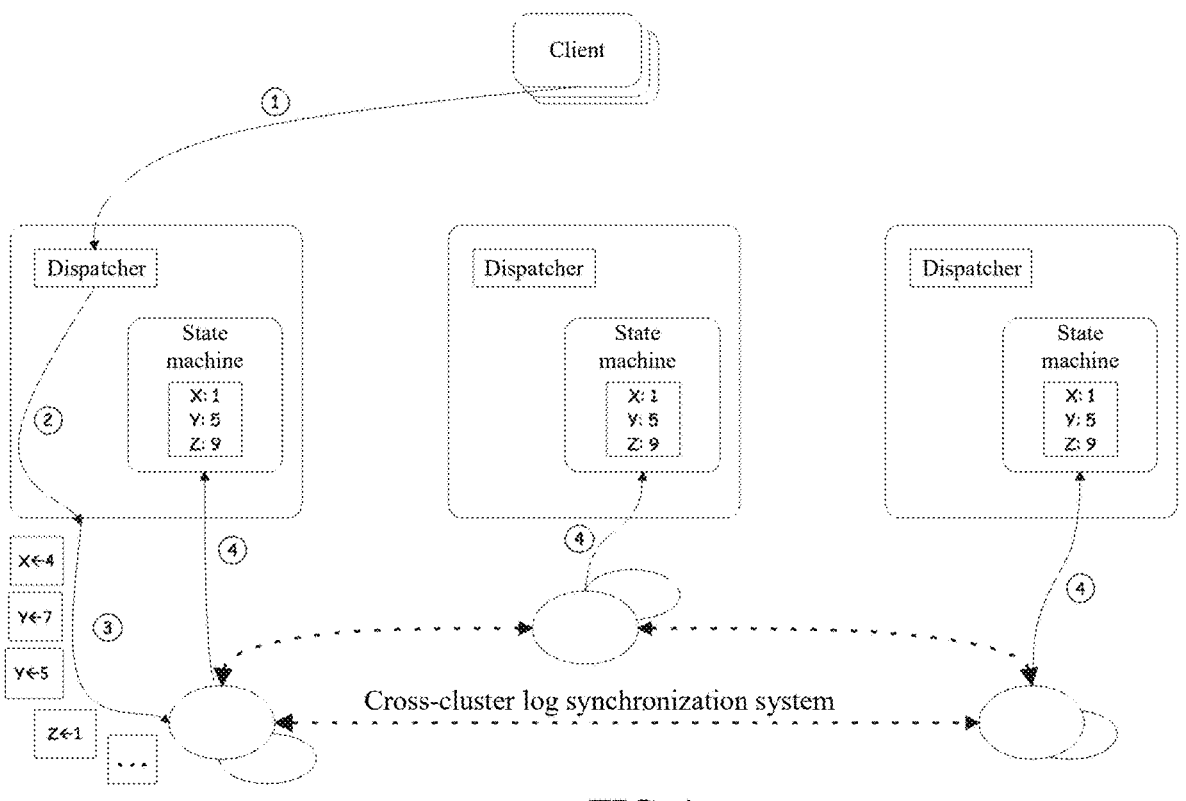
FIG. 1 is a schematic diagram of the process of a cross-cluster synchronous replication solution provided according to an embodiment of the present specification.

In the following description, numerous specific details are set forth in order to provide a thorough understanding of the present specification. However, the present specification can be implemented in many other ways than those described herein, and those skilled in the art can make similar extensions without violating the connotation of the present specification. Therefore, the present specification is not limited to the specific implementations disclosed below.

The terms used in one or more embodiments of the present specification are for the purpose of describing particular embodiments only and are not intended to limit one or more embodiments of the present specification. As used in the one or more embodiments of the present specification and the appended claims, the singular forms "a", "an", "said," and "the" are intended to include the plural forms as well, unless the context clearly indicates otherwise. It should also be understood that the term "and/or" used in one or more embodiments of the present specification refers to and encompasses any or all possible combinations of one or more of the associated listed items.

It should be understood that although the terms "first", "second", etc. may be used to describe various information in one or more embodiments of the present specification, the information should not be limited to these terms. These terms are used only to distinguish information of the same type from one another. For example, without departing from the scope of the one or more embodiments of the present specification, the "first" may be referred to as the "second", and similarly, the "second" may be referred to as the "first". The word "if" as used herein may be interpreted as "when" or "while" or "in response to determining", depending on the context.

First of all, terms involved in the one or more embodiments of the present specification will be explained.

Cluster: multiple or even thousands of servers are concentrated together and divided into multiple machine groups. Each machine group runs the same service. Each server here is not indispensable. Their common role is to alleviate the pressure of concurrent access and avoid single point failures, thereby realizing a highly available, highly scalable, and low-cost distributed system.

Available Zone: an available zone refers to a physical area with independent power and network in the same region, including one or more IDC rooms. The network delay within the same available zone will be relatively small, and fault isolation can be achieved between different available zones.

RPO (Recovery Point Objective): the data recovery point objective in a disaster recovery system, measured in time, that is, the time point required when the system and data must be recovered after a disaster occurs. RPO indicates the maximum amount of data loss that the system can tolerate. The smaller the amount of data loss the system tolerates, the smaller the RPO value.

RTO (Recovery Time Objective): the service recovery point objective in a disaster recovery system, measured in time, that is, the time required for system functions to be recovered from outage after a disaster occurs. RTO indicates the maximum service outage time that the system can tolerate. The higher the service urgency requirement, the smaller the RTO value.

Synchronous replication: a design for data loss dimension in disaster recovery scenarios, which is generally based on a master-backup mechanism. Asynchronous replication refers to remote periodic replication of data from the master to the backup, generally across available zones or regions. The RPO is generally from second level to minute level, and has little impact on user IO. Synchronous replication is remote real-time replication of data with an RPO of zero, which maximizes user data consistency, but will result in performance loss.

Multi-Region active-active: multi-region active-active means that data access services can be provided simultaneously among multiple different physical regions, and the regions are not in a master-backup relationship. Active-active is a higher-level requirement in a disaster recovery system. While RPO is zero, RTO is also required to be zero. That is, in a case where a single-region failure occurs, system services can be recovered immediately and there is no data loss.

Consensus protocol: a mechanism by which multiple nodes in a distributed system reach consensus on a proposed value. By continuously reaching consensus on multiple rounds of proposed values, a distributed consistency system is formed. Typical consensus protocols include Paxos, Raft, EPaxos, etc.

With the advent of big data era, data has emerged as a pivotal asset and the lifeline of enterprises. Thus, the necessity for data disaster recovery has become ubiquitous for numerous enterprise-level users, especially for Internet, financial and other enterprises. Many enterprises may meet their data disaster recovery needs through data protection products. Data protection products may be divided into different disaster recovery levels based on RPO and RTO. Generally speaking, the smaller the RPO and RTO, the less data loss and faster data recovery time, but the corresponding cost will also be higher. According to the RPO and RTO values from small to large, data protection products may be divided into asynchronous replication and synchronous replication. Here, asynchronous replication is remote periodic replication of data, generally across available zones or regions, with an RPO generally ranging from second level to minute level, and has little impact on user IO. Synchronous replication is remote real-time replication of data, generally across available zones, with an RPO of zero, which maximizes the consistency of user data, but will result in corresponding performance loss.

Asynchronous replication and synchronous replication are important features of storage products. Many cloud storage products and database products are making every effort to build asynchronous replication and synchronous replication. On this basis, Internet, financial and other enterprises have further proposed a higher level of disaster recovery capability to compress RTO/RPO to zero, that is, in a case where a single-region (single available zone) failure occurs, system services (storage services provided by the distributed system) can be recovered immediately, and data can also be guaranteed not to be lost. Therefore, how storage products should respond to and plan for such higher-level disaster recovery capabilities has become a problem that needs to be solved.

Based on this, taking into account the need to implement redundant disaster recovery technology, the present specification provides a solution for data replication and consistent consensus; specifically, a cross-cluster synchronous replication solution based on a consensus protocol. FIG. 1 is a schematic diagram of the process of a cross-cluster synchronous replication solution, that is, a replication state machine model, provided according to an embodiment of the present specification. As shown in FIG. 1, the technical solution based on consistent consensus is widely used because of its natural sequencing ability and reliability guarantee of data consistency. By deploying a synchronization system based on a consensus protocol (i.e., the cross-cluster log synchronization system in the figure, consensus based replication) across clusters, each cluster is regarded as a replication state machine. A client's write request (i.e. "X←4", "Y←7", "Y←5", "Z←1" in the figure) will be forwarded to this cross-cluster synchronization system by a dispatcher configured in each cluster. Each node in the synchronization system corresponds to a service state machine of a certain cluster. In the synchronization system, nodes will apply log data (i.e., write requests) that they have synchronized to a corresponding service state machine. The service state machine of each cluster provides read access services directly to clients.

As shown in FIG. 1, a failure in any one of the multiple clusters will not result in data loss. Moreover, the cross-cluster log synchronization system based on the consensus protocol not only supports strict global sequencing, but also provides data disaster recovery capabilities. The failure of some nodes will not affect the overall service availability and data integrity. Therefore, based on the consensus protocol, it is relatively easy to achieve synchronous replication capability with RPO=0.

Figure 2:
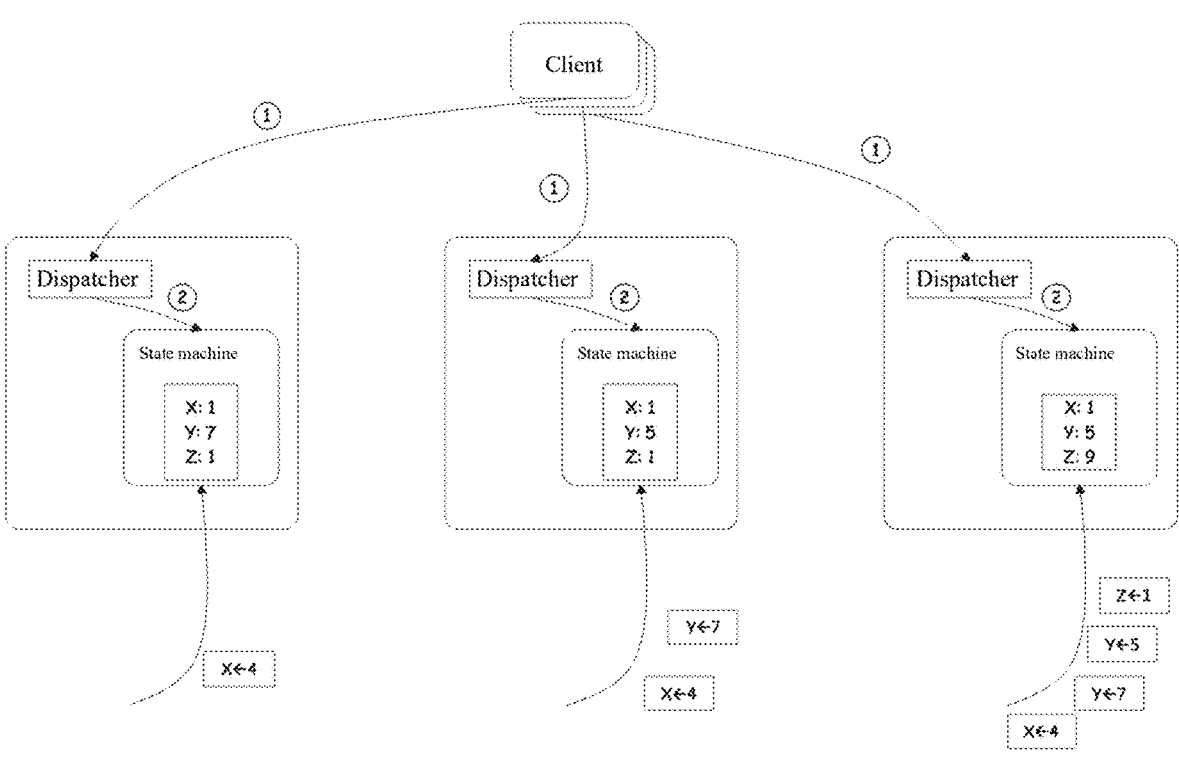
FIG. 2 is a schematic diagram of data update in a cross-cluster synchronous replication solution provided according to an embodiment of the present specification.

However, although synchronous replication based on the consensus protocol is simple to implement, it also has disadvantages, namely, data update state is consistent in each computer room in the end. As shown in FIG. 2, FIG. 2 is a schematic diagram illustrating data update in a cross-cluster synchronous replication solution provided according to an embodiment of the present specification; wherein, logs updated by the service state machine of each cluster must be in sequence, and data updates of the corresponding state machines cannot be strictly synchronized. Therefore, the client accessing different clusters may see that different values correspond to the same key value, or even read old data. Therefore, the consistency of data among different clusters cannot be strictly guaranteed, resulting in the problem of storage data loss when any of the multiple clusters fails.

Based on this, in the present specification, a data processing method is provided. The present specification also involves a data processing apparatus, a data processing system, a computing device, a computer-readable storage medium and a computer program, which are described in detail one by one in the following embodiments.

Figure 3:
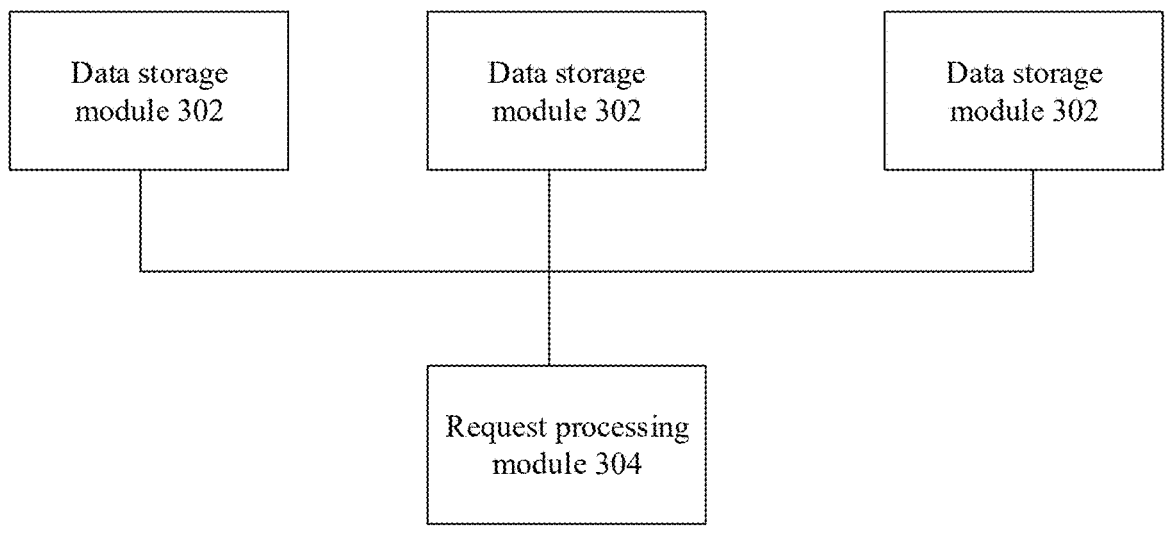
FIG. 3 is a schematic structural diagram of a data processing system provided according to an embodiment of the present specification.

FIG. 3 shows a schematic structural diagram of a data processing system provided according to an embodiment of the present specification, wherein the system includes a request processing module 302 and at least two data storage modules 304, wherein:

the request processing module 302 is configured to receive a data update request, wherein the data update request carries target data for updating initial data in data storage units included in the data storage modules 304; generate, based on the target data, a data preprocessing request for the target data, and send the data preprocessing request to the at least two data storage modules 304 respectively;

the at least two data storage modules 304 are configured to set data storage units corresponding to the target data to be inaccessible based on the data preprocessing request, and send a preprocessing completion notification to the request processing module 302;

the request processing module 302 is further configured to send, in a case where the preprocessing completion notification returned by each data storage module 304 according to the data preprocessing request is received, the data update request to the at least two data storage modules 304;

the at least two data storage modules 304 are configured to update, according to the data update request, the initial data in the data storage units with the target data, and send a data processing completion notification to the request processing module 302.

Here, the request processing module 302 may be understood as a module capable of sending the received data processing request to each data storage module 304 and ensuring the consistency of target data of each data storage module 304. For example, the request processing module 302 may be understood as the cross-cluster log synchronization system (consensus based replication) in the above embodiments.

The data storage module 304 may be understood as a module capable of storing target data. In practical applications, the data storage module 304 may be understood as a cluster, a service state machine in a cluster, a server, an available zone, a data center, a physical disk in a computer, a memory in a computer, etc., and the present specification does not impose any specific restrictions on this. In order to avoid excessive elaboration, the following explanation is given by taking the data storage module 304 as a cluster.

The initial data may be understood as data stored in the data storage module 304. For example, the initial data may be parameters, multimedia data, documents, applications, scripts, etc., which are not specifically limited in the present specification. The target data may be understood as data used to update the initial parameters in the data storage module 304. The target data may also be parameters, multimedia data, documents, applications, scripts, etc., which are not specifically limited in the present specification. It should be explained that the data type of the initial data and the data type of the target data may be the same or different.

The data storage unit may be understood as a unit in the data storage module 304 that stores the initial data. For example, the data storage unit may be understood as a physical storage medium in the cluster that stores the initial data, or a key value corresponding to the initial data. In practical applications, in a case where the initial data is a numerical value, the data storage unit may be a key value corresponding to the numerical value. For example, the initial data is a value "1"; the data storage unit is a key value "Z".

The data update request may be understood as a request to update the initial data in the data storage module 304. For example, in a case where the initial data is a value "1" and the target data is a value "5", the data update request may be understood as a request to update the value "1" stored in the cluster to the value "5".

The data preprocessing request may be understood as a request of instructing the data storage module 304 to set the data storage unit to be inaccessible before performing data update. In actual applications, this is done to avoid the situation where users may read historical data from a cluster due to different speeds of data update operations performed by multiple clusters or service state machines in the cluster. Therefore, the cross-cluster log synchronization system (hereinafter referred to as the synchronization system) can first set the data storage unit storing the initial data to be inaccessible during the process of performing data update operations in at least multiple clusters or service state machines in the clusters, and then set the current state of the data storage unit to be accessible after the data update is completed. For example, the service state machine in the cluster sets the state corresponding to the key value "Z" to "Prep (i.e., preparation)" state. When a user initiates a read request for the key value "Z" in the "Prep" state, the read request will be blocked, which means it is put on hold or paused. In addition, after the synchronization system updates the value corresponding to the key value "Z" from the value "1" to the value "5", it will clear the "Prep" state of the key value "Z", avoiding the problem of reading old data by the user during the update of the service state machine in the cluster. Based on this, the data preprocessing request may also be a "Prep" request. The "Prep" request can instruct the service state machine in the cluster to set the state of a specific key value to "Prep". Accordingly, the data update request may be a request "Z←1".

The preprocessing completion notification may be understood as a notification in which the data storage module 304 indicates the request processing module 302 that it has completed the operation of setting the data storage unit to be inaccessible.

The data processing completion notification may be understood as a notification in which the data storage module 304 indicates (i.e., informs) the request processing module 302 that it has completed the update operation of the initial data through the target data.

Specifically, in the data processing system provided in the present specification, a data update request can be received through the request processing module 302, and the data update request carries target data, which is used to update initial data in the data storage unit included in the data storage module 304.

After receiving the data update request, the request processing module 302 first needs to generate, based on the target data, a data preprocessing request for the target data, and send the data preprocessing request to the at least two data storage modules 304 to instruct the at least two data storage modules 304 to perform preprocessing work before data updating.

After receiving the data preprocessing request, each data storage module 304 can set the data storage unit corresponding to the target data to be inaccessible, and send a preprocessing completion notification to the request processing module 302 to instruct the request processing module 302 to issue the data update request.

Then, in a case where the preprocessing completion notification returned by each data storage module 304 according to the data preprocessing request is received, the request processing module 302 determines that all data storage modules 304 are ready, and therefore sends the data processing request to each data storage module 304.

After receiving the data update request sent by the request processing module 302, each data storage module 304 updates the initial data in the data storage unit based on the target data carried in the data update request, and send a data processing completion notification to the request processing module 302.

In actual applications, the request processing module 302 will continue to send a new data update request and data preprocessing request to the data storage module only after receiving the data processing completion notification sent by the data storage module 304, so that each data storage module 304 can continue to perform data update operations.

The following further explains the data processing system by taking its application in a cross-cluster synchronous replication scenario supporting multi-region active-active as an example, wherein the request processing module 302 is a synchronous system, the data storage module 304 is a service state machine in a cluster, the target data is a value "5", the initial data is a value "1", the data storage unit is a key value "Z", the data preprocessing request is a "Prep Z" request for the key value "Z", and the data update request is a data write request (request "Z←1").

Based on this, the synchronization system in the data processing system provided in the present specification, when receiving a data write request (the request "Z←1"), can split each write request into two sub-requests. Therefore, the request "Z←1" will be converted into two sub-requests, i.e., "Z←1" and "Prep Z". It should be explained that splitting a write request into two sub-requests may generate a "Prep Z" request that instructs the service state machine in the cluster to change the state corresponding to the key value "Z" to the "Prep" state, according to "Z←1" carried in the write request.

Afterwards, the two sub-requests will be learned and applied by the state machine of each cluster in strict sequence and synchronization. First, the sub-request "Prep Z" is made public to each cluster state machine for learning, that is, the "Prep Z" request is sent to the service state machine in each cluster, thereby instructing the service state machine in each cluster to change the state corresponding to the key value "Z" to the "Prep" state.

Moreover, the synchronization system will disclose the sub-request "Z←1" only after the sub-request is learned and clearly responded to by the state machine of each cluster, that is, after receiving a state change completion notification sent by the service state machine in each cluster, so that the state machines of respective clusters learn and apply the sub-request "Z←1", that is, modify the value "1" corresponding to the key value "Z" to the value "5". This ensures that data is updated synchronously.

The data processing system provided in the present specification implements cross-cluster synchronous replication based on a consensus replication state machine. The problem is that the data presented in the state machines of respective clusters is eventually consistent. Therefore, in an active-active scenario, if the client accesses the state machines of different clusters successively, the data seen may be rolled back (that is, the new version of data is seen first, and then the old version of data is seen), so active-active cannot be effectively supported. The data processing system provided in the present specification introduces a two-phase apply. The state machine modifies the state of the relevant key value based on the first-phase Prep sub-request, marks that the key value is being modified, and then when a read request faces a key value in the "Prep" state, it needs to actively wait until the second-phase modification sub-request is learned and applied locally, and then the latest data can be read. This makes multi-region active-active cross-cluster synchronous replication be achieved, thereby ensuring the data consistency of each cluster, further avoiding the problem of data loss when any cluster among multiple clusters fails, and ensuring data security.

FIG. 4 shows a flow chart of a data processing method provided according to an embodiment of the present specification, which specifically includes the following steps.

Step 402: receiving a data processing request, wherein the data processing request carries target data.

Here, the data processing request may be understood as a request that can process the target data. In practical applications, the data processing request may be understood as a data update request or a data storage request. The data update request may refer to the description of the data update request in the above description of the data processing system. The data storage request may be understood as a request of storing the target data in a data storage module.

In an embodiment provided in the present specification, the data processing request is sent by a dispatcher deployed in a cluster. In actual applications, in a case where any one of multiple clusters receives a data processing request sent by a client, the data processing request can be sent to a synchronization system through the dispatcher deployed in the cluster. The data processing request is sent to each cluster through the synchronization system, thereby ensuring the synchronous replication of multiple clusters. The specific implementation is as follows.

Receiving the data processing request includes:

receiving a data processing request sent by a target data storage module among at least two data storage modules, wherein the target data storage module is a module that receives the data processing request sent by a request initiator.

Specifically, in a case where the data storage module receives a data processing request sent by the client, it can forward the data processing request to a request processing module through a request forwarding unit configured in itself, so that the request processing module can receive the data processing request. Here, the request forwarding unit may be understood as a unit capable of forwarding the data processing request to the request processing module, such as a dispatcher deployed in a cluster.

The following takes the data processing method provided in the present specification applied to a cross-cluster synchronous replication scenario supporting multi-region active-active as an example to further explain receiving a data processing request. In a case where any one of the multiple clusters receives a data update request and/or a data storage request, it can send the data update request and/or the data storage request to the request processing module through a dispatcher deployed in the cluster itself.

Furthermore, in the embodiments provided in the present specification, the data processing request may be a data update request. Based on this, after receiving the data update request, the request processing module can subsequently send the data update request to multiple data storage modules through a two-phase apply method, thereby ensuring the data consistency of the data storage modules. The specific implementation is as follows.

Receiving the data processing request includes:

receiving a data update request carrying target data, wherein the target data is data for updating initial data in a data storage unit.

Here, the initial data and the data storage unit may refer to the corresponding or respective content in the above description of the data processing system.

Specifically, the request processing platform can receive a data update request carrying target data. Correspondingly, the description of the data update request may refer to the corresponding or respective content in the above description of the data processing system.

Step 404: generating, based on the target data, a data preprocessing request for the target data.

Here, in a case where the data processing request is a data update request, the data preprocessing request may be understood as a request instructing the data storage module to set the data storage unit to be inaccessible before updating the data. In a case where the data processing request is a data storage request, the data preprocessing request may be understood as a request instructing the data storage module to determine the data storage unit for storing the target data and set the data storage unit to be inaccessible before data storage, thereby facilitating the subsequent successful storage of the target data in the data storage unit.

In an embodiment provided in the present specification, generating, based on the target data, the data preprocessing request for the target data includes:

in a case where there are at least two data processing requests, determining target data carried in each data processing request;

generating, based on data storage units corresponding to each target data in the at least two data storage modules, a data preprocessing request for the data storage units corresponding to each target data respectively.

Here, in a case where the data processing request is a data storage request, the target data may be understood as data that needs to be stored in a data storage module, and correspondingly, the data storage unit may be understood as a unit where the target data needs to be stored. The data storage unit may be configured according to actual application scenarios. In a case where the data storage module is a cluster, the data storage unit may be a physical storage medium in the cluster, or a key value in the cluster.

Specifically, the data processing request includes at least two requests. In this case, the request processing system needs to determine target data carried in each data processing request; and determine data storage units corresponding to the target data in the at least two data storage modules; and generate data preprocessing requests for the data storage units corresponding to each target data respectively.

In an embodiment provided in the present specification, the main design ideas of the data processing method include three aspects: consensus queue, two-phase apply, and read-write separation.

Here, the consensus queue refers to decoupling cluster service state machines and the cross-cluster log synchronization system, so that the cross-cluster log synchronization system relies on one separate queue based on the consensus protocol, through which data processing requests and corresponding data preprocessing requests are sent to service state machines of clusters. Subsequently, the state machine of each cluster needs to update local data by actively learning and confirming from the queue. This decoupling design can smoothly support the expansion of cluster state machines. The specific implementation is as follows.

After generating, based on the data storage units corresponding to each target data in the at least two data storage modules, the data preprocessing request for the data storage units corresponding to each target data respectively, the method further includes:

determining request processing sequence information corresponding to each data processing request, wherein the request sequence information is determined based on request receiving time corresponding to each data processing request;

storing the data processing requests and the corresponding data preprocessing requests in a request sending queue based on the request processing sequence information.

Here, the request processing sequence information may be understood as the request receiving time corresponding to each data processing request, and the request receiving time may be understood as the time when the request processing platform receives each data processing request. Alternatively, the request processing sequence information may also be a serial number, number, ID, etc. assigned by the request processing platform to the data processing request according to the request receiving time. For example, the request processing sequence information corresponding to the first data processing request received by the request processing platform may be a serial number "1", and correspondingly, the request processing sequence information corresponding to the second data processing request received may be a serial number "2".

Figures 5, 6:
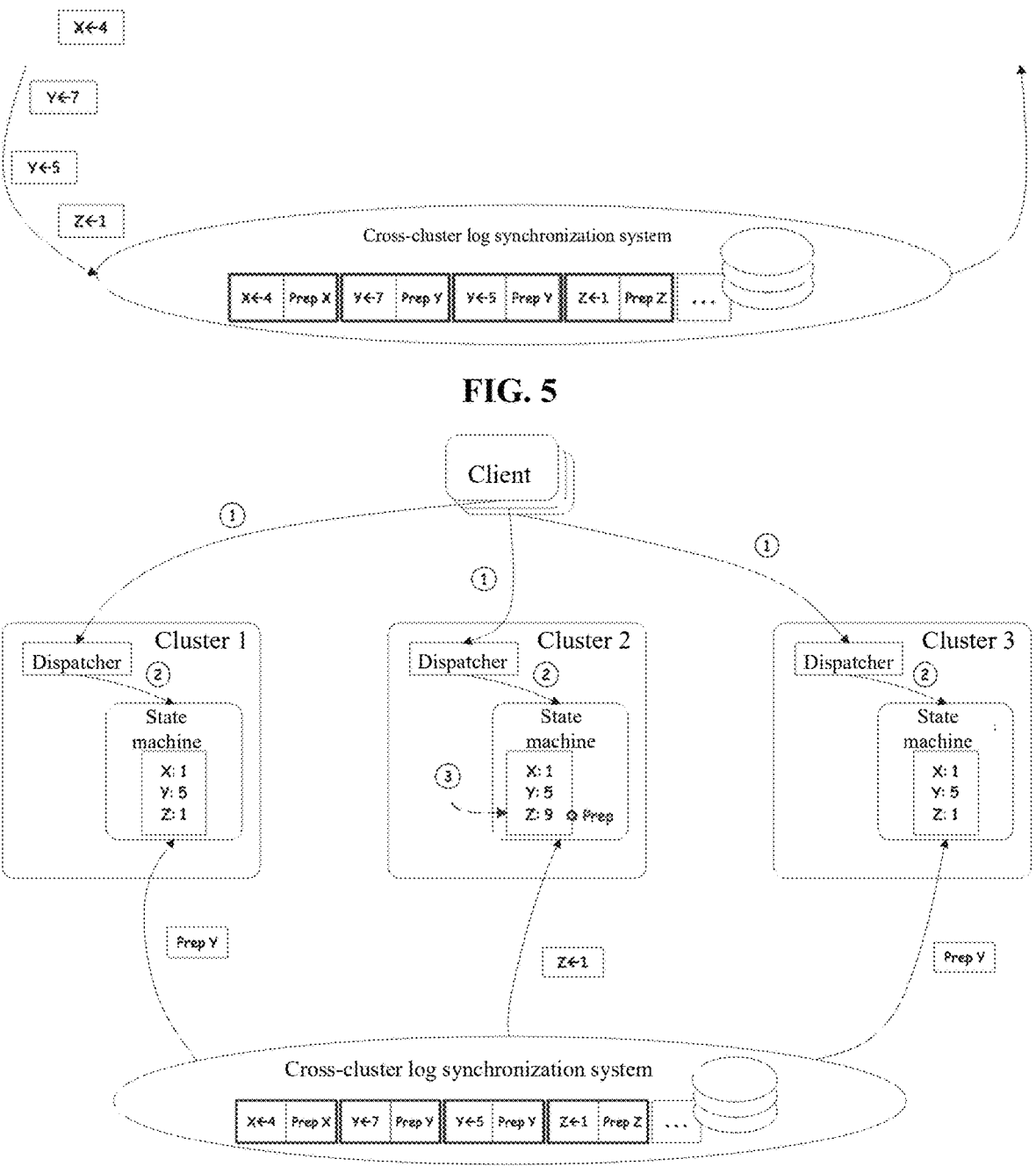
FIG. 5 is a schematic diagram of a consensus queue in a data processing method provided according to an embodiment of the present specification.
FIG. 6 is a processing schematic diagram of reading data from a cluster in a data processing method provided according to an embodiment of the present specification.

Specifically, after determining the data preprocessing request corresponding to the data processing request, the request processing platform determines the request processing sequence information corresponding to each data processing request and stores the data preprocessing request corresponding to the data processing request in a request sending queue based on the request processing sequence information. The request sending queue may be a consensus queue. Reference may be made to FIG. 5, which is a schematic diagram of a consensus queue in a data processing method provided in an embodiment of the present specification. The consensus queue stores multiple data write requests and a sub-request "Prep Z" corresponding to each data write request.

Referring to FIG. 5, in an embodiment provided in the present specification, the two-phase apply in the main design concept of the data processing method means that for each write request, the replication queue based on the consensus protocol will split it into two sub-requests. For example, the request "Z←1" will be converted into two sub-requests, i.e., "Z←1" and "Prep Z". The two sub-requests will be learned and applied by the state machine of each cluster in strict order and synchronization. The replication queue will first expose the sub-request "Prep Z" to each cluster state machine for learning. Only after this sub-request is learned and clearly responded to by each cluster state machine, the replication queue will further expose the sub-request "Z←1" to allow the state machine of each cluster to learn and apply it, thereby ensuring synchronous data updates. That is, only after the "Prep" request is applied (run) by each cluster, the formal request (data processing request) is provided for each cluster to learn. See steps 406 to 408 for details.

Step 406: sending the data preprocessing request to at least two data storage modules respectively.

Specifically, the request processing platform may first need to send the data preprocessing request to the at least two data storage modules respectively.

Sending the data preprocessing request to the at least two data storage modules respectively includes:

acquiring the data preprocessing request from the request sending queue, and sending the data preprocessing request to the at least two data storage modules respectively.

Specifically, after storing the data processing requests and the data preprocessing requests in the request sending queue, the request processing module may determine, from the request sending queue, a data processing request and a data preprocessing request that first enter the queue in a first-in-first-out manner; acquire this data preprocessing request, and send the data preprocessing request to the at least two data storage modules respectively. For example, referring to FIG. 5, after the synchronization system stores the data write request and the "Prep" request in the consensus queue, it can first send the "Prep Z" request to multiple clusters, and then, after receiving the clusters' reply to the "Prep Z" request, send the request "Z←1" to multiple clusters.

In actual applications, in order to avoid data inconsistency problems, the synchronization system will issue "Prep" requests and data write requests to multiple clusters based on the consensus queue, in a manner of processing one request at a time. Although data consistency is guaranteed, the efficiency of issuing tasks is low. Therefore, in the data processing method provided in the present specification, multiple data processing requests for different data storage units can be executed simultaneously, thereby improving the efficiency of request issuance while ensuring data consistency. The specific implementation is as follows.

Sending the data preprocessing request to the at least two data storage modules respectively includes:

determining identification information of data storage units corresponding to each target data;

determining a target data storage unit from the data storage units according to the identification information, wherein the identification information of the target data storage unit is different from the identification information of other data storage units;

determining the data preprocessing request for the target data storage unit as a target data preprocessing request;

acquiring the target data preprocessing request from the request sending queue, and sending the target data preprocessing request to the at least two data storage modules respectively.

Here, the identification information of the data storage unit may be understood as information that uniquely identifies a data storage unit. For example, in a case where the data storage unit is a key value, the identification information is the name of the key value. In a case where the data storage unit is a storage area in a physical disk, the identification information may be the serial number of the storage area.

Continuing with the above example, referring to FIG. 5, the consensus queue stores multiple data write requests ("X←4", "Y←7", "Y←5", "Z←1") and corresponding "Prep" requests ("Prep X", "Prep Y", "Prep Y", "Prep Z"). Based on this, the synchronization system may determine key value names (i.e., X, Y, Y, or Z) of key values corresponding to target data from each data write request. Afterwards, the synchronization system determines target key values (X, Y, Z) from multiple key values based on the key value names; determines "Prep" requests corresponding to the key values (that is, "Prep X", "Prep Y", or "Prep Z") according to the positions of the key values in the consensus queue, and sends the "Prep X" request, "Prep Y" request, and "Prep Z" request to multiple clusters.

Step 408: in a case where a preprocessing completion notification returned by each data storage module in response to the data preprocessing request is received, sending the data processing request to each data storage module.

Here, the preprocessing completion notification is a notification generated by each data storage module after setting the data storage unit corresponding to the target data to be inaccessible in response to the data preprocessing request. For example, in the case where the data processing request is a data update request, the preprocessing completion notification may be a request sent to the synchronization system by a service state machine in the cluster after setting the state corresponding to the key value "Z" to the "Prep" state. Here, when the cluster receives a read request for the key value "Z", the request will be blocked (paused).

In practical applications, the read-write separation in the main design ideas of the data processing method provided in the present specification means that write requests may be continuously submitted to the replication queue based on the consensus protocol, and both sub-requests will be applied and persisted based on the consensus protocol. Here, both sub-requests will be persisted, which means that the synchronization system may store the two sub-requests in the local disk. The data stored in the local disk will not be lost when the synchronization system encounters power outages, shutdowns and other problems, thereby ensuring the persistence of the two sub-requests.

Therefore, in the data processing method provided in the present specification, the access performance of the write request can be fully guaranteed. On the other hand, the data processing method provided in the present specification can be used for multi-region active-active scenarios, so all read requests are strongly consistent reads. In a case where a read request accesses a state machine, if the state corresponding to a key value is the Prep state, the read request will be blocked until the relevant second-stage sub-request is learned and applied, and the value corresponding to the key value is updated, and then the read request will send back the updated key value. That is, the architecture based on read-write separation ensures the write throughput performance on the one hand, and the strong consistency of read on the other hand.

Refer to FIG. 6, which is a processing schematic diagram of reading data from a cluster in a data processing method provided according to an embodiment of the present specification. Referring to FIG. 6, it can be seen that the data processing method provided in the present specification adopts a read-write separation design. In a case where a key value in the "Prep" state is read, it waits for the second stage log to apply. Specifically, referring to FIG. 6, the data processing method provided in the present specification supports multi-region active-active cross-cluster synchronous replication. Therefore, there is no so-called master-backup clusters in the entire system, and all clusters can directly provide services to the outside.

An example of how to implement strongly consistent read in the solution is shown in FIG. 6. Taking the request "Z←1" as an example, the write request will be converted into two sub-requests: "Prep Z" and "Z←1". Here, in a case where a state machine applies the sub-request "Prep Z", the state of the relevant key value Z is marked with "Prep", which means that the key value is in a modified state and a read access request needs to be blocked until the state machine is updated. In a case where the state machine applies sub-request "Z←1", it means removing the "Prep" state mark and modifying the value corresponding to the key value to 1. The read request can directly send back a key value that is not marked with the "Prep" state.

Continuing taking FIG. 6 as an example, first, the first stage "Prep Z" is learned and applied to the state machines of all clusters, and then the second stage "Z←1" is published for learning and applying by each cluster. Assume that clusters 1 and 3 learn and apply first, the value corresponding to key value Z in the state machines becomes 1, while the current value of key value Z in cluster 2 is still 9. However, due to the Prep in the first stage, the state corresponding to this key value is "Prep". Therefore, read requests accessing this cluster will continue to wait for the subsequent "Z←1" request to be applied to the state machine and clear the "Prep" state. Through two-phase apply, this technical proposal achieves strong consistency read.

In the embodiment provided in the present specification, after acquiring the data preprocessing request from the request sending queue and sending the data preprocessing request to the at least two data storage modules respectively, correspondingly, sending the data processing request to each data storage module includes:

determining a data processing request corresponding to the data preprocessing request from the request sending queue, and sending the data processing request to each data storage module.

Continuing with the above example, after the synchronization system receives a reply notification sent back by each cluster for the "Prep Z" request, it can determine the request "Z←1" corresponding to the "Prep Z" request from the consensus queue and send the request "Z←1" to each cluster.

In the embodiment provided in the present specification, sending the data processing request to each data storage module includes:

determining a data processing request corresponding to the target data preprocessing request from the request sending queue, and sending the data processing request to each data storage module.

Continuing with the above example, after the synchronization system receives a reply notification sent back by each cluster for the "Prep X" request, the "Prep Y" request, or the "Prep Z" request, it can determine a data write request corresponding to the "Prep X" request, the "Prep Y" request, or the "Prep Z" request from the consensus queue, and send the data write request to each cluster.

Step 410: receiving a data processing completion notification returned by each data storage module in response to the data processing request.

Here, in the case where the data processing request is a data storage request, the data processing completion notification may be understood as a notification generated after each data storage module stores the target data in the data storage unit, that is, after each cluster stores the value "1" in the corresponding physical storage area or key value, it will send back a data storage completion notification to the synchronization system, informing the synchronization system that the cluster has completed data storage. This will facilitate the synchronization system to subsequently continue to execute subsequent data processing requests after determining that all clusters have completed data storage.

Here, the data processing completion notification is a notification generated by each data storage module after updating the initial data in the data storage unit with the target data in response to the data processing request. That is, after each cluster updates the value "1" stored in the key value "Z" based on the value "5", it will send back a data update completion notification to the synchronization system, informing the synchronization system that the cluster has completed the data update. This will facilitate the synchronization system to subsequently continue to execute subsequent data processing requests after determining that all clusters have completed the data update.

Based on this, after the data storage module completes processing on the target data based on the data processing request, it can send a data processing completion notification to the request processing module. This enables the request processing module to receive the data processing completion notification returned by each data storage module in response to the data processing request.

In addition, the data processing method provided in the present specification supports multi-region active-active cross-cluster synchronous replication. Therefore, the request processing module can also receive a read access request sent by a dispatcher deployed in the cluster. The read access request may be a request sent by the client to the dispatching system.

After receiving the read access request, the request processing module may convert the read access request into a no-op write request (no-operation read request), use the no-op write request as a data processing request, and perform the above operations on the data processing request, or store the no-op write request as a data processing request in a queue, and send the no-op write request to each cluster or a cluster that sends the read access request through the queue. The state machine in the cluster that sends the read access request can directly read data corresponding to the local state machine key value after the no-op write request is learned and applied on the local state machine. Based on this, this method does not require the two-phase apply of the consistency replication queue. Instead, the latest data is synchronize by converting each read request into a write request by the state machine, which ensures strong consistency of read.

In the data processing method provided in the present specification, in a case where a data processing request is received, first a data preprocessing request is generated based on target data carried in the data processing request, and the data preprocessing request is sent to at least two data storage modules. In a case where a preprocessing completion notification sent back by each data storage module is received, the data processing request is sent to each data storage module, so that each data storage module can acquire the target data, thereby ensuring the data consistency of each data storage module, further avoiding the problem of data loss caused by failure of any data storage module among the at least two data storage modules, and ensuring the security of data.

The above is an illustrative solution of a data processing method of the present embodiment. It should be explained that the technical solution of the data processing method and the technical solution of the above-mentioned data processing system fall under the same concept. For details not described in detail in the technical solution of the data processing method, please refer to the description of the technical solution of the above-mentioned data processing system.

Similarly, the technical solution of the above-mentioned data processing system and the technical solution of the data processing method fall under the same concept. For details not described in detail in the technical solution of the data processing system, please also refer to the description of the technical solution of the data processing method.

The following further describes the data processing method provided in the present specification by taking the application of the data processing method in a cross-cluster synchronous replication scenario as an example in conjunction with FIG. 7. Here, FIG. 7 shows a processing flow chart of a data processing method provided in an embodiment of the present specification, which specifically includes the following steps.

Step 702: a client sends a data write request to any one of multiple clusters.

Here, the data write request may be a request "Z←1".

Step 704: after receiving the data write request, the cluster sends the data write request to a synchronization system through a dispatcher.

Here, the synchronization system is a cross-cluster log synchronization system.

Step 706: the synchronization system generates a "Prep Z" request for the data write request.

Step 708: the synchronization system stores the request "Z←1" and the corresponding "Prep Z" request into a consensus queue.

Step 710: the synchronization system first sends the "Prep Z" request in the consensus queue to a state machine of each cluster.

Step 712: after receiving the "Prep Z" request, the state machine of each cluster modifies the state of the key value "Z" to "Prep" and replies to the synchronization system with a state change notification.

Step 714: after receiving the state change notification from each cluster, the synchronization system sends the request "Z←1" to each cluster.

Step 716: based on the request "Z←1", the state machine of each cluster modifies the value corresponding to the key value "Z" to "1", resets the "Prep" state of the key value "Z", and replies to the synchronization system that the data writing is completed.

The data processing method provided in the present specification implements cross-cluster synchronous replication based on a consensus replication state machine. The problem is that the data presented in the state machines of respective clusters is eventually consistent. Therefore, in an active-active scenario, if the client accesses the state machines of different clusters successively, the data seen may be rolled back (that is, the new version of data is seen first, and then the old version of data is seen), so active-active cannot be effectively supported. The data processing system provided in the present specification introduces a two-phase apply. The state machine modifies the state of the relevant key value based on the first-phase Prep sub-request, marks that the key value is being modified, and then when a read request faces a key value in the "Prep" state, it needs to actively wait until the second-phase modification sub-request is learned and applied locally, and then the latest data can be read. This makes multi-region active-active cross-cluster synchronous replication be achieved. This ensures the data consistency of each cluster, further avoiding the problem of data loss when any cluster among multiple clusters fails, and ensures data security.

Figure 8:
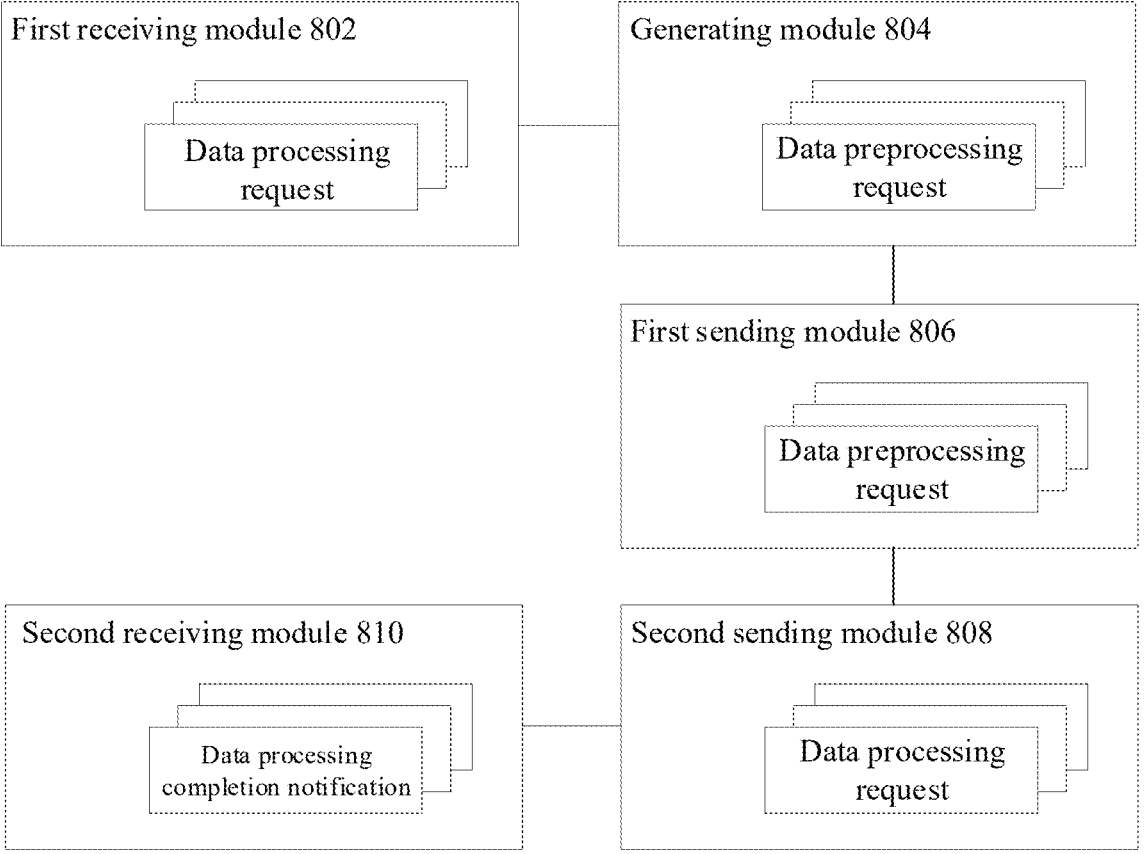
FIG. 8 is a schematic structural diagram of a data processing apparatus provided according to an embodiment of the present specification.

Corresponding to the above method embodiments, the present specification also provides data processing apparatus embodiments. FIG. 8 shows a schematic structural diagram of a data processing apparatus provided by an embodiment of the present specification. As shown in FIG. 8, the apparatus includes:

a first receiving module 802 configured to receive a data processing request, wherein the data processing request carries target data;

a generating module 804 configured to generate, based on the target data, a data preprocessing request for the target data;

a first sending module 806 configured to send the data preprocessing request to at least two data storage modules respectively;

a second sending module 808 configured to, in a case where a preprocessing completion notification returned by each data storage module in response to the data preprocessing request is received, send the data processing request to each data storage module; and a second receiving module 810 configured to receive a data processing completion notification returned by each data storage module in response to the data processing request.

Alternatively, the generating module 804 is further configured to:

in a case where there are at least two data processing requests, determine target data carried in each data processing request; and generate, according to data storage units corresponding to each target data in the at least two data storage modules, a data preprocessing request for the data storage units corresponding to each target data respectively.

Alternatively, the data processing apparatus further includes a storage module configured to:

determine request processing sequence information corresponding to each data processing request, wherein the request sequence information is determined based on request receiving time corresponding to each data processing request; and store the data processing requests and the corresponding data preprocessing requests in a request sending queue based on the request processing sequence information.

Alternatively, the first sending module 806 is further configured to:

acquire the data preprocessing request from the request sending queue and send the data preprocessing request to the at least two data storage modules respectively.

Accordingly, the second sending module 808 is further configured to:

determine the data processing request corresponding to the data preprocessing request from the request sending queue, and send the data processing request to each data storage module.

Alternatively, the first sending module 806 is further configured to:

determine identification information of the data storage units corresponding to each target data;

determine a target data storage unit from the data storage units according to the identification information, wherein the identification information of the target data storage unit is different from the identification information of other data storage units;

determine a data preprocessing request for the target data storage unit as a target data preprocessing request; and acquire the target data preprocessing request from the request sending queue, and send the target data preprocessing request to at least two data storage modules respectively.

Alternatively, the second sending module 808 is further configured to:

determine a data processing request corresponding to the target data preprocessing request from the request sending queue and send the data processing request to each data storage module.

Alternatively, the preprocessing completion notification is a notification generated after each data storage module sets the data storage unit corresponding to the target data to be inaccessible in response to the data preprocessing request.

Alternatively, the first receiving module 802 is further configured to:

receive a data processing request sent by a target data storage module among the at least two data storage modules, wherein the target data storage module is a module that receives the data processing request sent by a request initiator.

Alternatively, the first receiving module 802 is further configured to:

receive a data update request carrying target data, wherein the target data is data for updating initial data in a data storage unit.

Alternatively, the second receiving module 810 is further configured to:

the data processing completion notification is a notification generated after each data storage module updates the initial data in the data storage unit with the target data, in response to the data processing request.

The data processing system provided in the present specification, in a case where a data processing request is received, first generates a data preprocessing request based on target data carried in the data processing request, and sends the data preprocessing request to at least two data storage modules; and in a case where a preprocessing completion notification sent back by each data storage module is received, sends the data processing request to each data storage module, so that each data storage module can acquire the target data, thereby ensuring the data consistency of each data storage module, further avoiding the problem of data loss caused by failure of any data storage module among the at least two data storage modules, and ensuring the security of data.

The above is an illustrative solution of a data processing apparatus of the present embodiment. It should be explained that the technical solution of the data processing apparatus and the technical solution of the above-mentioned data processing method fall under the same concept. For details not described in detail in the technical solution of the data processing apparatus, please refer to the description of the technical solution of the above-mentioned data processing method.

Figure 9:
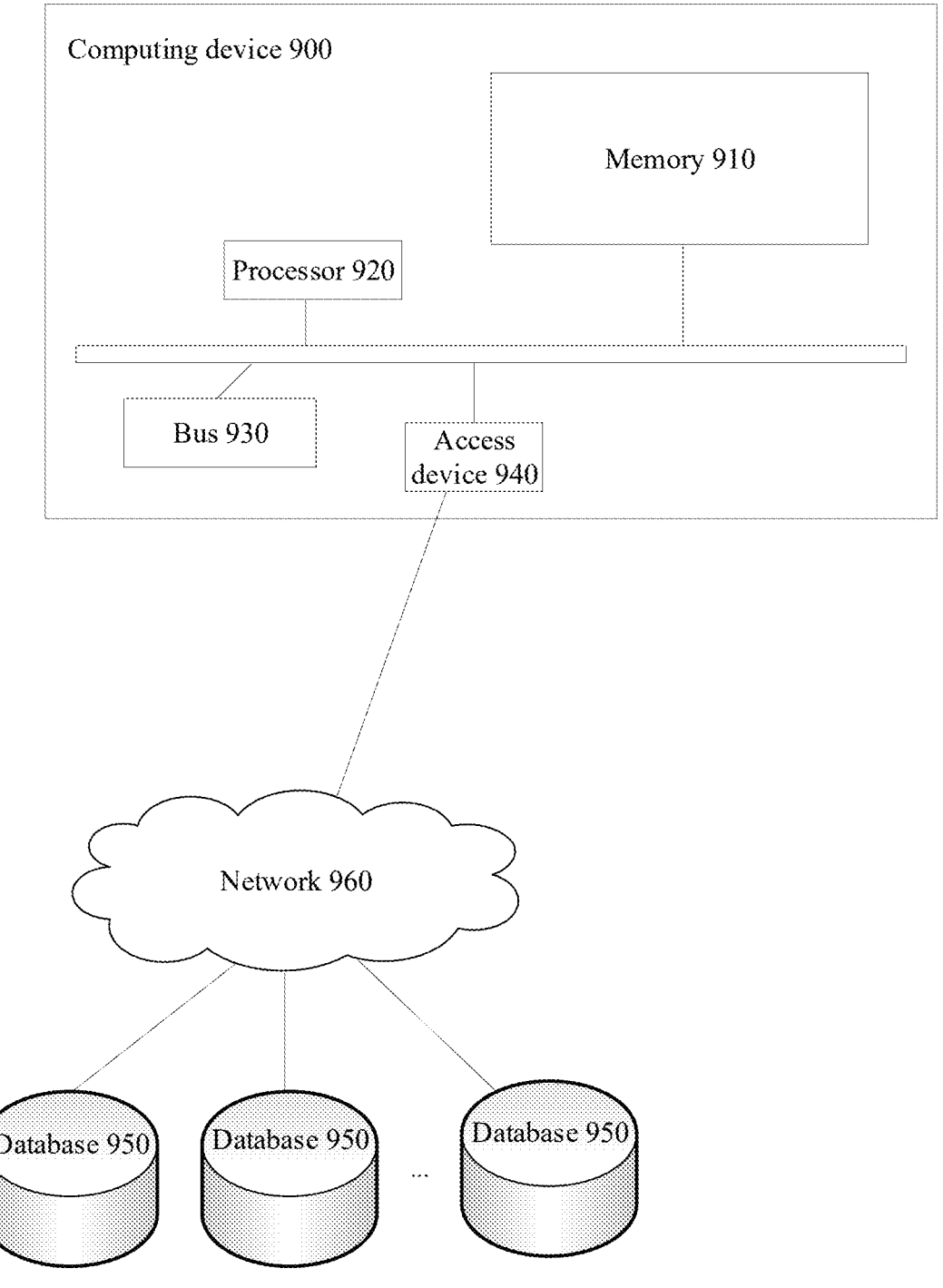
FIG. 9 is a structural block diagram of a computing device provided according to an embodiment of the present specification.

FIG. 9 shows a structural block diagram of a computing device 900 provided according to an embodiment of the present specification. Components of the computing device 900 include, but are not limited to, a memory 910 and a processor 920. The processor 920 is connected to the memory 910 via a bus 930. A database 950 is used for storing data.

The computing device 900 also includes an access device 940 that enables the computing device 900 to communicate via one or more networks 960. Examples of these networks include the Public Switched Telephone Network (PSTN), a Local Area Network (LAN), a Wide Area Network (WAN), a Personal Area Network (PAN), or a combination of communication networks such as the Internet. The access device 940 may include one or more of any type of network interface (e.g., a network interface card (NIC)) whether wired or wireless, such as an IEEE 802.11 wireless local area network (WLAN) wireless interface, a Worldwide Interoperability for Microwave Access (Wi-MAX) interface, an Ethernet interface, a Universal Serial Bus (USB) interface, a cellular network interface, a Bluetooth interface, a Near Field Communication (NFC) interface, and the like.

In one embodiment of the present specification, the above components of the computing device 900 and other components not shown in FIG. 9 may also be connected to each other, for example, through a bus. It should be understood that the structural block diagram of the computing device shown in FIG. 9 is for illustrative purposes only and is not intended to limit the scope of the present specification. Those skilled in the art may add or replace other components as need.

The computing device 900 may be any type of stationary or mobile computing device, including a mobile computer or mobile computing device (e.g., a tablet computer, a personal digital assistant, a laptop computer, a notebook computer, a netbook computer, etc.), a mobile phone (e.g., a smartphone), a wearable computing device (e.g., a smart watch, smart glasses, etc.), or other type of mobile device, or a stationary computing device such as a desktop computer or PC. The computing device 900 may also be a mobile or stationary server.

Here, the processor 920 is used for executing the following computer executable instructions, which, when executed by the processor 920, implement the steps of the above-mentioned data processing method.

The above is an illustrative solution of a computing device of the present embodiment. It should be explained that the technical solution of the computing device and the technical solution of the above-mentioned data processing method fall under the same concept. For details not described in detail in the technical solution of the computing device, please refer to the description of the technical solution of the above-mentioned data processing method.

Embodiments of the present specification further provide a computer-readable storage medium having computer-executable instructions stored thereon, which, when executed by a processor, implement the steps of the above-mentioned data processing method.

The above is an illustrative solution of the computer-readable storage medium of the present embodiment. It should be explained that the technical solution of the storage medium and the technical solution of the above-mentioned data processing method fall under the same concept. For details not described in detail in the technical solution of the storage medium, please refer to the description of the technical solution of the above-mentioned data processing method.

An embodiment of the present specification further provides a computer program, which, when executed in a computer, causes the computer to perform the steps of the above-mentioned data processing method.

The above is an illustrative solution of the computer program of the present embodiment. It should be explained that the technical solution of the computer program and the technical solution of the above-mentioned data processing method fall under the same concept. For details not described in detail in the technical solution of the computer program, please refer to the description of the technical solution of the above-mentioned data processing method.

The above describes specific embodiments of the present specification. Other embodiments are within the scope of the following claims. In some cases, actions or steps recited in the claims may be performed in an order different from that in the embodiments and still achieve desirable results. In addition, processes depicted in the accompanying figures do not necessarily require the particular order shown, or sequential order, to achieve desirable results. In certain implementations, multitasking and parallel processing are also possible or may be advantageous.

The computer instructions include computer program codes, which may be in source code form, object code form, executable file, or some intermediate form. The computer-readable medium may include: any entity or apparatus capable of carrying computer program codes, recording medium, USB flash drive, mobile hard disk, magnetic disk, optical disk, computer memory, read-only memory (ROM), random access memory (RAM), electrical carrier signal, telecommunication signal and software distribution medium, etc. It should be explained that the content contained in the computer-readable medium may be appropriately increased or decreased according to the requirements of legislation and patent practices in the jurisdiction. For example, in some jurisdictions, according to legislation and patent practices, computer-readable media do not include electrical carrier signals and telecommunication signals.

It should be explained that, for the sake of convenience in description, the aforementioned method embodiments are all expressed as a combination of a series of actions, but those skilled in the art should be aware that the embodiments of the present specification are not limited to the described order of actions, because according to the embodiments of the present specification, certain steps may be performed in other orders or simultaneously. Secondly, those skilled in the art should also be aware that the embodiments described in the present specification are all preferred embodiments, and the actions and modules involved are not necessarily required by the embodiments of the present specification.

In the above embodiments, the description of each embodiment has its own emphasis. For parts that are not described in detail in a certain embodiment, reference may be made to the relevant descriptions of other embodiments.

The preferred embodiments of the present specification disclosed above are only used to help illustrate the present specification. The optional embodiments do not describe all details exhaustively nor limit the invention to the specific embodiments described. Obviously, many modifications and changes may be made based on the content of the embodiments of the present specification. The present specification selects and specifically describes these embodiments in order to better explain the principles and practical applications of the embodiments of the present specification, so that those skilled in the art can well understand and use the present specification. The present specification is limited only by the claims appended hereto along with their full scope and equivalents.

What is claimed is:

1. A data processing method, comprising:

receiving a data processing request, wherein the data processing request carries target data;

generating, based on the target data, a data preprocessing request for the target data;

sending the data preprocessing request to at least two data storage modules respectively;

when it is determined that a preprocessing completion notification returned by each data storage module in response to the data preprocessing request is received, sending the data processing request to each data storage module; and receiving a data processing completion notification returned by each data storage module in response to the data processing request;

wherein when it is determined that there are at least two data processing requests, the method further comprises:

determining request processing sequence information corresponding to each data processing request, wherein the request processing sequence information is determined based on request receiving time corresponding to each data processing request;

storing, based on the request processing sequence information, the data processing requests and corresponding data preprocessing requests in a request sending queue.

2. The data processing method as claimed in claim 1, wherein generating, based on the target data, the data preprocessing request for the target data comprises:

when it is determined that there are at least two data processing requests, determining target data carried in each data processing request; and generating, based on data storage units corresponding to each target data in the at least two data storage modules, a data preprocessing request for the data storage units corresponding to each target data respectively.

3. The data processing method as claimed in claim 1, wherein sending the data preprocessing request to the at least two data storage modules respectively comprises:

acquiring the data preprocessing request from the request sending queue, and sending the data preprocessing request to the at least two data storage modules respectively;

accordingly, wherein sending the data processing request to each data storage module comprises:

determining a data processing request corresponding to the data preprocessing request from the request sending queue, and sending the data processing request to each data storage module.

4. The data processing method as claimed in claim 1, wherein sending the data preprocessing request to the at least two data storage modules respectively comprises:

determining identification information of the data storage units corresponding to each target data;

determining a target data storage unit from the data storage units according to the identification information, wherein the identification information of the target data storage unit is different from identification information of other data storage units;

determining a data preprocessing request for the target data storage unit as a target data preprocessing request;

acquiring the target data preprocessing request from the request sending queue, and sending the target data preprocessing request to the at least two data storage modules respectively.

5. The data processing method as claimed in claim 4, wherein sending the data processing request to each data storage module comprises:

determining a data processing request corresponding to the target data preprocessing request from the request sending queue, and sending the data processing request to each data storage module.

6. The data processing method as claimed in claim 4, wherein the preprocessing completion notification is a notification generated by each data storage module after setting, based on the data preprocessing request, a data storage unit corresponding to the target data to be inaccessible.

7. The data processing method as claimed in claim 1, wherein receiving the data processing request comprises:

receiving a data processing request sent by a target data storage module among the at least two data storage modules, wherein the target data storage module is a module that receives the data processing request sent by a request initiator.

8. The data processing method according to claim 1, wherein receiving the data processing request comprises:

receiving a data update request carrying target data, wherein the target data is data for updating initial data in a data storage unit.

9. The data processing method as claimed in claim 8, wherein the data processing completion notification is a notification generated by each data storage module after updating, based on the data processing request, the initial data in the data storage unit with the target data.

10. A non-transitory computer-readable storage medium having computer-executable instructions stored thereon which, when executed by a processor, implement steps of the data processing method as claimed in claim 1.

11. A data processing system, comprising a request processing module and at least two data storage modules, wherein the request processing module is configured to receive a data update request carrying target data for updating initial data in data storage units comprised in the data storage modules; generate, based on the target data, a data preprocessing request for the target data; and send the data preprocessing request to the at least two data storage modules respectively;

the at least two data storage modules are configured to set data storage units corresponding to the target data to be inaccessible based on the data preprocessing request, and send a preprocessing completion notification to the request processing module;

the request processing module is further configured to send, when it is determined that the preprocessing completion notification returned by each data storage module in response to the data preprocessing request is received, the data update request to the at least two data storage modules; and the at least two data storage modules are configured to update, according to the data update request, the initial data in the data storage units with the target data, and send a data processing completion notification to the request processing module;

the request processing module is further configured to, when it is determined that there are at least two data processing requests, determine request processing sequence information corresponding to each data processing request, wherein the request processing sequence information is determined based on request receiving time corresponding to each data processing request; and store, based on the request processing sequence information, the data processing requests and corresponding data preprocessing requests in a request sending queue.

12. A computing device, comprising:

a memory and a processor;

wherein the memory is used for storing computer-executable instructions, and the processor is used for executing the computer-executable instructions to perform operations of:

receiving a data processing request, wherein the data processing request carries target data;

generating, based on the target data, a data preprocessing request for the target data;

sending the data preprocessing request to at least two data storage modules respectively;

when it is determined that a preprocessing completion notification returned by each data storage module in response to the data preprocessing request is received, sending the data processing request to each data storage module; and receiving a data processing completion notification returned by each data storage module in response to the data processing request;

wherein the processor is used for executing the computer-executable instructions to perform operations of:

when it is determined that there are at least two data processing requests, determining request processing sequence information corresponding to each data processing request, wherein the request processing sequence information is determined based on request receiving time corresponding to each data processing request;

storing, based on the request processing sequence information, the data processing requests and corresponding data preprocessing requests in a request sending queue.

13. The computing device as claimed in claim 12, wherein the processor is used for executing the computer-executable instructions to perform operations of:

when it is determined that there are at least two data processing requests, determining target data carried in each data processing request; and generating, based on data storage units corresponding to each target data in the at least two data storage modules, a data preprocessing request for the data storage units corresponding to each target data respectively.

14. The computing device as claimed in claim 12, wherein the processor is used for executing the computer-executable instructions to perform operations of:

acquiring the data preprocessing request from the request sending queue, and sending the data preprocessing request to the at least two data storage modules respectively;

accordingly, wherein sending the data processing request to each data storage module comprises:

determining a data processing request corresponding to the data preprocessing request from the request sending queue, and sending the data processing request to each data storage module.

15. The computing device as claimed in claim 12, wherein the processor is used for executing the computer-executable instructions to perform operations of:

determining identification information of the data storage units corresponding to each target data;

determining a target data storage unit from the data storage units according to the identification information, wherein the identification information of the target data storage unit is different from identification information of other data storage units;

determining a data preprocessing request for the target data storage unit as a target data preprocessing request;

acquiring the target data preprocessing request from the request sending queue, and sending the target data preprocessing request to the at least two data storage modules respectively.

16. The computing device as claimed in claim 15, wherein the processor is used for executing the computer-executable instructions to perform operations of:

determining a data processing request corresponding to the target data preprocessing request from the request sending queue, and sending the data processing request to each data storage module.

17. The computing device as claimed in claim 15, wherein the preprocessing completion notification is a notification generated by each data storage module after setting, based on the data preprocessing request, a data storage unit corresponding to the target data to be inaccessible.

18. The computing device as claimed in claim 12, wherein the processor is used for executing the computer-executable instructions to perform operations of:

receiving a data processing request sent by a target data storage module among the at least two data storage modules, wherein the target data storage module is a module that receives the data processing request sent by a request initiator.

* * * * *